US011542424B1

(12) United States Patent
Nzeadibe et al.

(10) Patent No.: US 11,542,424 B1
(45) Date of Patent: Jan. 3, 2023

(54) WELLBORE SERVICING FLUIDS AND METHODS FOR CONTROLLING FLUID LOSSES IN PERMEABLE ZONES

(71) Applicant: Halliburton Energy Services, Inc., Houston, TX (US)

(72) Inventors: Kingsley Ihueze Nzeadibe, Houston, TX (US); Shubhajit Ghosh, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/546,417

(22) Filed: Dec. 9, 2021

(51) Int. Cl.
| | |
|---|---|
| C09K 8/514 | (2006.01) |
| C09K 8/035 | (2006.01) |
| E21B 33/14 | (2006.01) |
| E21B 21/00 | (2006.01) |
| C09K 8/487 | (2006.01) |

(52) U.S. Cl.
CPC ............. *C09K 8/514* (2013.01); *C09K 8/035* (2013.01); *C09K 8/487* (2013.01); *E21B 21/003* (2013.01); *E21B 33/14* (2013.01); *C09K 2208/04* (2013.01)

(58) Field of Classification Search
CPC .................................................. C09K 8/035
See application file for complete search history.

(56) References Cited

U.S. PATENT DOCUMENTS

| | | | |
|---|---|---|---|
| 1,177,126 | A | 3/1916 | Miller |
| 3,496,902 | A | 2/1970 | Cleary et al. |
| 4,120,369 | A | 10/1978 | Fischer et al. |
| 4,958,685 | A | 9/1990 | Hihara et al. |
| 6,664,215 | B1 | 12/2003 | Tomlinson |
| 7,284,611 | B2 | 10/2007 | Reddy et al. |
| 7,350,576 | B2 | 4/2008 | Robertson et al. |
| 9,410,066 | B2 | 8/2016 | Ghassemzadeh |
| 10,035,941 | B2 | 7/2018 | Whitfill et al. |
| 11,091,964 | B1 | 8/2021 | Whitfill et al. |
| 2005/0000690 | A1 | 1/2005 | Boney |
| 2005/0199390 | A1 | 9/2005 | Curtice et al. |
| 2007/0261848 | A1* | 11/2007 | Benton ............... C09K 8/506 507/110 |
| 2010/0152070 | A1 | 6/2010 | Ghassemzadeh |
| 2010/0230164 | A1 | 9/2010 | Pomerleau |
| 2015/0292278 | A1 | 10/2015 | Wang |
| 2016/0137903 | A1 | 5/2016 | Friedheim et al. |
| 2016/0145483 | A1 | 5/2016 | Lecerf et al. |
| 2017/0369757 | A1 | 12/2017 | Pisklak et al. |
| 2019/0233706 | A1* | 8/2019 | Adewole ................ C09K 8/08 |
| 2020/0317980 | A1* | 10/2020 | Amanullah ........... C09K 8/035 |

FOREIGN PATENT DOCUMENTS

| | | |
|---|---|---|
| EP | 3495606 A2 | 6/2019 |
| WO | 2005078235 A1 | 8/2005 |
| WO | 2008077499 A1 | 7/2008 |
| WO | 2018160253 A1 | 9/2018 |
| WO | 2020142064 A1 | 7/2020 |

OTHER PUBLICATIONS

Foreign Communication from Related Application—International Search Report and Written Opinion of the International Searching Authority, International Application No. PCT/US2020/034693, dated Feb. 10, 2021, 10 pages.
Foreign Communication from Related Application—International Search Report and Written Opinion of the International Searching Authority, International Application No. PCT/US2020/041987, dated Mar. 11, 2021, 10 pages.
Foreign Communication from Related Application—International Search Report and Written Opinion of the International Searching Authority, International Application No. PCT/US2020/063899, dated Mar. 18, 2021, 12 pages.
Filing Receipt, Specification and Drawings for U.S. Appl. No. 63/000,184, entitled "Method to Manage Tandem Single String Reactive LCM Pill Applications," filed Mar. 26, 2020, 61 pages.
Abdulrazzaq, Waseem et al., "Chemical Sealant Loss Circulation Materials for Fractured Formations: Right-Angle Viscosity Development with High Plugging Efficiency," SPE Kingdom of Saudi Arabia Annual Technical Symposium and Exhibition, Apr. 2018, SPE-192328-MS, 9 pages, Society of Petroleum Engineers.
Savari, Sharath et al., "Next-Generation, Right-Angle-Setting Composition for Eliminating Total Loss Circulation," presented at SPE/IADC Middle East Drilling Technology Conference and Exhibition, Oct. 2013, SPE/IADC 166697, 5 pages, SPE/IADC Middle East Drilling Technology Conference and Exhibition.
Tirado, Guillermo et al., "A Novel Heat-Activation RSF to Treat Severe Case of Lost Circulation: Case Histories from Mexico," presented at IADC/SPE Drilling Conference, Mar. 2008, IADC/SPE 112645, 15 pages, IADC/SPE Drilling Conference.
Vasquez, Julio et al., "A Novel Temperature-Activated, Rigid-Setting Material: Case Histories and Lessons Learned After More than 500 Well Interventions for Drilling and Conformance Applications," presented at SPE Annual Technical Conference and Exhibition, Oct. 2013, SPE 166221, 10 pages, Society for Petroleum Engineers.
Vasquez, J., "A Novel Temperature-Activated, Rigid-Setting Material: Case Histories for Drilling and Conformance Offshore Applications," presented at Offshore Technology Conference Brazil, Oct. 2013, OTC 24417, 13 pages, Offshore Technology Conference.
Dick, M.A., et al. "Optimizing the Selection of Bridging Particles for Reservoir Drilling Fluids," presented at 2000 International Symposium on Formation Damage, Feb. 23-24, 2000, 8 pages, Society of Petroleum Engineers.
"Walnut Shell Powder," https://www.bio-powder.com/en/walnut-shell, 9 pages, BioPowder.com.

(Continued)

*Primary Examiner* — William D Hutton, Jr.
*Assistant Examiner* — Avi T Skaist
(74) *Attorney, Agent, or Firm* — Conley Rose, P.C.; Rodney B. Carroll

(57) ABSTRACT

A method of servicing a wellbore penetrating a subterranean formation, the method including placing a wellbore servicing fluid into the wellbore proximate a permeable zone. The wellbore servicing fluid comprises a base fluid and from about 3 wt. % to about 25 wt. % by total weight of the wellbore servicing fluid of a particulate material. The particulate material comprises palm kernel shells.

10 Claims, No Drawings

(56) References Cited

OTHER PUBLICATIONS

"Mohs' Hardness (Typical) of Abrasives," Reade, 6 pages, Reade International Corp.
Office Action dated Mar. 18, 2022 (20 pages), U.S. Appl. No. 16/922,243, filed Jul. 7, 2020.

* cited by examiner

WELLBORE SERVICING FLUIDS AND METHODS FOR CONTROLLING FLUID LOSSES IN PERMEABLE ZONES

BACKGROUND

This disclosure relates to wellbore servicing fluids for use in controlling fluid losses in a wellbore environment, more particularly, a wellbore penetrating a subterranean formation.

A natural resource such as hydrocarbons residing in a subterranean formation can be recovered by drilling a wellbore into the formation. In various scenarios, a fluid may be communicated between the wellbore and the subterranean formation surrounding a portion of the wellbore. It is well known that wellbores may pass through a number of zones within a subterranean formation other than the particular hydrocarbon zones of interest. Some of these zones may be water-producing, gas-producing, or both. In some scenarios, undesired water production, gas production, or both can affect the economic life of hydrocarbon producing wells and can potentially induce other problems, such as sand production, scale, and corrosion of tubulars. It may be desirable to prevent water and/or gas from such zones from being produced with commercially desirable hydrocarbons. One of the most common methods of eliminating, or at least slowing, water and/or gas production is to introduce a shut-off fluid into one or more zones within the formation surrounding the wellbore. After identification of zone(s), water/gas shut off fluids can be pumped into place and allowed to form a physical barrier to impede the in-flow of water and/or gas into the wellbore.

Additionally or alternatively, in some scenarios, fluids used in a wellbore servicing operation may be lost to the subterranean formation while circulating the fluids within the wellbore. In particular, the fluids may enter the subterranean formation via lost circulation zones, for example, depleted zones, zones of relatively low pressure, zones having naturally-occurring fractures or induced fracture, weak zones having fracture gradients exceeded by the hydrostatic pressure of the wellbore servicing fluid (e.g., drilling fluid), and so forth. As a result, the service provided by such wellbore servicing fluid is more difficult to achieve. For example, a drilling fluid may be lost to the formation, resulting in the circulation and the pressure of the fluid in the wellbore being too low to allow for further drilling of the wellbore. Also for example, a secondary cement/sealant composition may be lost to the formation as it is being placed in the wellbore, thereby rendering the secondary operation ineffective in maintaining isolation of the formation.

Accordingly, an ongoing need exists for methods for blocking fluid communication between a wellbore and the surrounding subterranean formations, for example, for combatting the outflow of fluid from the wellbore through lost circulation zones into a surrounding subterranean formation.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used herein, a "wellbore servicing fluid" refers to a fluid used to drill, complete, work over, fracture, repair, or in any way service a wellbore meant to recover materials residing in a subterranean formation penetrated by the wellbore. Examples of wellbore servicing fluids include, but are not limited to, drilling fluids or muds, spacer fluids, lost circulation fluids, cement slurries, washing fluids, sweeping fluids, acidizing fluids, fracturing fluids, gravel packing fluids, diverting fluids or completion fluids. It is to be understood that "subterranean formation" encompasses both areas below exposed earth and areas below earth covered by water such as ocean or fresh water.

As also used herein, "top" means the well at a well surface (e.g., at a wellhead which may be located on dry land or below water, e.g., a subsea wellhead), and the direction along a wellbore towards the well surface is referred to as "up," without regard to absolute distance from the surface. Likewise, "bottom" means the end of a wellbore away from the surface, and the direction along a wellbore away from the wellbore surface is referred to as "down," without regard to absolute distance from the surface. For example, in a wellbore having a horizontal portion, two locations may be at the same depth (i.e., distance from the surface within a subterranean formation), the location closer to the well surface (by comparing the lengths along the wellbore from the wellbore surface to the locations) is referred to as "above" the other location.

Generally, a wellbore servicing fluid (WSF) is a fluid designed and prepared to resolve a specific wellbore or reservoir condition or accomplish a specific end in a wellbore environment. This disclosure involves a WSF, and components thereof, that exhibits properties effective to control, remedy, or prevent a loss of fluid, for example, the loss of a fluid present within a wellbore to the surrounding subterranean formation. In various embodiments, the WSF may be characterized and/or used as a drilling fluid, a drill-in fluid, a fluid loss control fluid (also referred to as a lost circulation fluid herein), a spacer fluid, a cement fluid (also referred to as a cementitious fluid herein), or a completion fluid.

Disclosed herein is a wellbore servicing fluid (WSF) that generally includes a base fluid and a particulate material. The term "base fluid" generally refers to a major component of the fluid (as opposed to components dissolved and/or suspended therein), and does not indicate any particular condition or property of that fluid such as its mass, amount, pH, etc.

In some embodiments, the particulate material includes particulate palm kernel shells. The term "palm kernel shells" generally refers to the shell fractions of the seed of oil palm fruit. The palm kernel shells may be a by-product of palm oil production, for example, remaining after the nut of the oil pal fruit has been removed. Palm kernel shells may be characterized as fibrous and woody.

The palm kernel shells can have a physical shape as suitable for incorporation within the WSF, examples of which may be selected from platelets, shavings, fibers, flakes, ribbons, rods, strips, spheroids, toroids, pellets, tablets, or any other physical shape.

In some embodiments, the palm kernel shells may be characterized as having a particulate size distribution such that at least about 50% of the palm kernel shells, by weight of the palm kernel shells, has a particle size from about 125 microns to about 2,000 microns, additionally or alternatively, at least about 60% of the palm kernel shells, at least about 70% of the palm kernel shells, at least about 80% of the palm kernel shells, at least about 90% of the palm kernel shells, at least about 95% of the palm kernel shells, at least about 97.50 of the palm kernel shells, at least about 99% of the palm kernel shells, at least about 99.5 of the palm kernel shells, or at least about 99.9% of the palm kernel shells, by weight of the palm kernel shells, has a particle size from about 125 microns to about 2,000 microns.

In some embodiments, the palm kernel shells may have a multimodal particle size distribution. For example, the palm kernel shells may have a multimodal particle size distribution such as a bimodal particle size distribution, a trimodal particle size distribution, or other suitable particle size distribution as desired, inter alia, on a WSF particular application. In some embodiments, the palm kernel shells includes a first portion of palm kernel shells having a weight average particle size in a range of from about 125 microns to about 750 microns, a second portion of palm kernel shells having a weight average particle size in a range of from about 800 microns to about 1,100 microns, a third portion of particulate material having a weight average particle size in the range of from about 1,150 microns to about 1,350 microns, and a fourth portion of particulate material having a weight average particle size in the range of from about 1,400 microns to about 1,800 microns.

For example, in some embodiments, the palm kernel shells may be characterized as having a particulate size distribution such that at least about 10% of the palm kernel shells, by weight of the palm kernel shells, has a particle size from about 125 microns to about 750 microns, additionally or alternatively, from about 5% to about 99% of the palm kernel shells, from about 10% to about 75% of the palm kernel shells, from about 15% to about 50% of the palm kernel shells, from about 20% to about 30% of the palm kernel shells, by weight of the palm kernel shells, has a particle size from about 125 microns to about 750 microns.

Additionally or alternatively, the palm kernel shells may be characterized as having a particulate size distribution such that at least about 10% of the palm kernel shells, by weight of the palm kernel shells, has a particle size from about 800 microns to about 1,100 microns, additionally or alternatively, from about 5% to about 99% of the palm kernel shells, from about 10% to about 75% of the palm kernel shells, from about 15% to about 50% of the palm kernel shells, from about 20% to about 30% of the palm kernel shells, by weight of the palm kernel shells, has a particle size from about 800 microns to about 1,100 microns.

Additionally or alternatively, the palm kernel shells may be characterized as having a particulate size distribution such that at least about 10% of the palm kernel shells, by weight of the palm kernel shells, has a particle size from about 1,150 microns to about 1,350 microns, additionally or alternatively, from about 5% to about 99% of the palm kernel shells, from about 10% to about 75% of the palm kernel shells, from about 15% to about 50% of the palm kernel shells, from about 20% to about 30% of the palm kernel shells, by weight of the palm kernel shells, has a particle size from about 1,150 microns to about 1,350 microns.

Additionally or alternatively, the palm kernel shells may be characterized as having a particulate size distribution such that at least about 10% of the palm kernel shells, by weight of the palm kernel shells, has a particle size from about 1,400 microns to about 1,800 microns, additionally or alternatively, from about 5% to about 99% of the palm kernel shells, from about 10% to about 75% of the palm kernel shells, from about 15% to about 50% of the palm kernel shells, from about 20% to about 30% of the palm kernel shells, by weight of the palm kernel shells, has a particle size from about 1,400 microns to about 1,800 microns.

In some embodiments, the total amount of the palm kernel shells in the WSF may be from about 3 wt. % to about 25 wt. % by total weight of the WSF, additionally or alternatively, from about 5 wt. % to about 20 wt. % or alternatively from about 5 wt. % to about 15 wt. %. For example, in some embodiments, the total amount of the palm kernel shells in the WSF is from about 3 lb per barrel (lb/bbl) to about 125 lb/bbl based on the total volume of the WSF, alternatively from about 4 lb/bbl to about 75 lb/bbl or alternatively from about 4 lb/bbl to about 55 lb/bbl.

In some embodiments, the particulate material further includes one or more second particulate materials. Examples of the second particulate material include, but are not limited to graphite, calcined petroleum coke, ground laminate, ground tires, ground nut shells (e.g., ground walnut shells), mica particles, polypropylene fibers, polymeric beads, calcium carbonate (e.g., ground marble), glass particles, sand, ceramic particles, ground battery casings, steel particles, or combinations thereof. Commercial examples of the second particulate material include, but are not limited, to BARACARB® 5-micron sized-calcium carbonate, BARACARB® 25-micron sized-calcium carbonate, BARACARB® 50-micron sized-calcium carbonate, and BARACARB® 150-micron sized-calcium carbonate, which are commercially available from Halliburton Energy Services, Inc.

As similarly discussed with respect to the palm kernel shells, in some embodiments, the second particulate material may be characterized as having a particulate size distribution such that at least about 50% of the palm kernel shells, by weight of the palm kernel shells, has a particle size from about 125 microns to about 2,000 microns, additionally or alternatively, at least about 75% of the palm kernel shells, at least about 90% of the palm kernel shells, or at least about 95% of the palm kernel shells, by weight of the palm kernel shells, has a particle size from about 125 microns to about 2,000 microns.

The second particulate material may be present as a component of the particulate material, in its entirety, in an amount sufficient to impart a desired parameter or characteristic to the particulate material, in its entirety, and/or the WSF. For example, in various embodiments the weight ratio of palm kernel shells to the second particulate material may range from about 500:1 to about 1:10, additionally or alternatively, a ratio from about 100:1 to 1:2, additionally or alternatively, from about 25:1 to about 1:1.

In some embodiments, the total amount of the particulate material in the WSF may be from about 3 wt. % to about 40 wt. % by total weight of the WSF, additionally or alternatively, from about 5 wt. % to about 25 wt. % or alternatively from about 5 wt. % to about 20 wt. %. For example, in some embodiments, the total amount of the palm kernel shells in the WSF is from about 3 lb per barrel (lb/bbl) to about 125 lb/bbl based on the total volume of the WSF, alternatively from about 4 lb/bbl to about 75 lb/bbl or alternatively from about 4 lb/bbl to about 60 lb/bbl.

In some embodiments, the base fluid includes an aqueous fluid. Aqueous fluids that may be used in the WSF include any aqueous fluid suitable for use in subterranean applications, provided that the aqueous fluid is compatible with the other components (e.g., scale inhibitor) used in the WSF. Water present in the WSF may be from any suitable source, examples of which include, but are not limited to, sea water, tap water, freshwater, water that is potable or non-potable, untreated water, partially treated water, treated water, produced water, city water, well-water, surface water, liquids including water-miscible organic compounds, or combinations thereof.

In some embodiments, the WSF may include one or more salts. For example, the aqueous fluid may include water or a brine. The aqueous brine may be naturally occurring or artificially-created. The salt or salts in the water may be present in an amount ranging from greater than about 0% by weight to a saturated salt solution, alternatively from about 1 wt. % to about 30 wt. %, or alternatively from about 5 wt. % to about 10 wt. %, based on the weight of the salt solution.

In various embodiments, the type and concentration of salts present in the base fluid may be selected dependent on one or more desired parameters for the WSF, for example, density (e.g., drilling fluid density, completion fluid density, etc.), which may range, without limitation, from about 8 lb/gallon to about 20 lb/gallon, alternatively from about 10 lb/gallon to about 18 lb/gallon, or alternatively from about 12 lb/gallon to about 16 lb/gallon. Nonlimiting examples of salts that may be present in an aqueous fluid (e.g., an aqueous brine) include chloride-based, bromide-based, phosphate-based or formate-based salts containing monovalent and/or polyvalent cations, salts of alkali and alkaline earth metals, or combinations thereof. In one or more particular embodiments, salt includes NaCl, KCl, NaBr, $CaCl_2$, $CaBr_2$, $MgCl_2$, $MgBr_2$, $ZnBr_2$, acetate salts, sodium acetate, potassium acetate, ammonium chloride ($NH_4Cl$), potassium phosphate, sodium formate, potassium formate, cesium formate, or combinations thereof.

Additionally or alternatively, in some embodiments that base fluid includes an oil-based or oleaginous fluid. Oleaginous fluids that may be used in the WSF include any oleaginous fluid suitable for use in subterranean applications, provided that the oleaginous fluid is compatible with the other components utilized in the WSF. Examples of oleaginous fluids include, but are not limited to, petroleum oils, natural oils, synthetically-derived oils, oxygenated fluids, or combinations thereof. In one or more particular embodiments, the oleaginous fluid is selected from diesel oil, kerosene oil, mineral oil, synthetic oils, aliphatic hydrocarbons, polyolefins (e.g., alpha olefins, linear alpha olefins and/or internal olefins), paraffins, silicone-based fluids, polydiorganosiloxanes, oxygenated solvents, esters, diesters of carbonic acid, alcohols, alcohol esters, ethers, ethylene glycol, ethylene glycol monoalkyl ether, ethylene glycol dialkyl ether, or combinations thereof.

Additionally or alternatively, in some embodiments, the base fluid includes an emulsion. In some embodiments, the emulsion may be an oil-in-water emulsion including a non-oleaginous (e.g., an aqueous fluid as previously described herein) continuous phase and an oleaginous fluid (e.g., an oleaginous fluid as previously described herein) discontinuous or dispersed phase.

The base fluid may be present within the WSF in any suitable amount. For example, the base fluid may be present within the WSF in an amount from about 10 wt. % to about 99 wt. %, alternatively from about 20 wt. % to about 95 wt. %, or alternatively from about 40 wt. % to about 90 wt. %, based on the total weight of the WSF. In some embodiments, the base fluid may include the balance of the WSF after considering the amount of the other components used. As will be appreciated by one of skill in the art with the aid of this disclosure, the amount of base fluid (e.g., aqueous base fluid) in the WSF depends on the desired parameters of (e.g., density and/or viscosity) of the WSF.

In various embodiments, the WSF further includes one or more components in addition to the base fluid and the particulate material, for example, as may be suitably selected depending upon the intended use and properties of the WSF.

In some embodiments, the WSF may further include a cementitious material, for example, such that the WSF is or includes a cementitious fluid. The cementitious material may be selected from calcium, aluminum, silicon, oxygen, iron, sulfur, or combinations thereof. In some embodiments, the cementitious material is selected from Portland cement, pozzolana cement, gypsum cement, shale cement, acid cement, base cement, phosphate cement, high alumina content cement, slag cement, silica cement, high alkalinity cement, magnesia cement, or combinations thereof. Examples of Portland cements include, but are not limited to, Class A, C, G, H, low sulfate resistant cements, medium sulfate resistant cements, high sulfate resistant cements, or combinations thereof. The class A, C, G, and H cements are classified according to API Specification 10. In some embodiments, a "high alumina content cement" refers to a cement having an alumna concentration in the range of from about 40 wt. % to about 80 wt. % by a weight of the high alumina content cement. In some embodiments, "high alkalinity cement" refers to a cement having a sodium oxide concentration in the range of from about 1.0 wt. % to about 2.0 wt. % by a weight of the high alkalinity cement. In such embodiments, the cementitious material may be present in the WSF in an amount from about 30 wt. % to about 80 wt. % based on the total weight of the WSF, alternatively from about 35 wt. % to about 75 wt. % or alternatively from about 40 wt. % to about 70 wt. %.

Additionally or alternatively, in some embodiments, the WSF further includes a gelling agent. The gelling agent may be selected from locust bean gum, Karaya gum, gum tragacanth, hydrophobically modified guars, high-molecular weight polysaccharides composed of mannose and galactose sugars, heteropolysaccharides obtained by fermentation of starch-derived sugars, xanthan, pectins, diutan, welan, gellan, scleroglucan, chitosan, dextran, substituted or unsubstituted galactomannans, starch, cellulose, cellulose ethers, carboxycelluloses, hydroxypropyl cellulose, carboxyalkylhydroxyethyl celluloses, carboxymethyl hydroxyethyl cellulose, methyl cellulose, sodium polyacrylate, polyacrylamide, partially hydrolyzed polyacrylamide, polymethacrylamide, poly(acrylamido-2-methyl-propane sulfonate), poly(sodium-2-acrylamide-3-propylsulfonate), copolymers of acrylamide and acrylamido-2-methyl-propane sulfonate, terpolymers of acrylamido-2-methyl-propane sulfonate, acrylamide and vinylpyrrolidone or itaconic acid, or combinations thereof. In some embodiments, the gelling agent has a molecular weight in a range of from equal to or greater than about 0.5 MM g/mol to equal to or less than about 5 MM g/mol, alternatively from equal to or greater than about 0.8 MM g/mol to equal to or less than about 5 MM g/mol, alternatively from equal to or greater than about 1.0 MM g/mol to equal to or less than about 5 MM g/mol, which may be measured by Gel Permeation chromatography (GPC). The gelling agent may be present in the WSF in an amount from about 0.001 wt. % to about 5 wt. %, based on the total weight of the WSF, alternatively from about 0.001 wt. % to about 4 wt. % or alternatively from about 0.01 wt. % to about 3 wt. %.

Additionally or alternatively, in some embodiments, the WSF further includes a fluid loss control additive. The fluid loss control additive may be selected from a polymer of methacrylates, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate (TMPTA), acrylamide, N—N dimethyl acrylamide, 2-Acrylamido-2-methylpropane sulfonic acid (AMPS), N-vinyl pyrrolidone, acryloylmorpholine, or combinations thereof. The fluid loss control additive may be present in the WSF in an amount from about 0.001 wt. % to about 10 wt. % based on the total weight of the WSF, alternatively from about 0.01 wt. % to about 9 wt. % or alternatively from about 0.1 wt. % to about 8 wt. %.

Additionally or alternatively, in some embodiments, the WSF may further include clay. The clay may be selected from a natural clay, a synthetic clay, or combinations thereof. In some embodiments, the clay includes bentonite, sodium bentonite, montmorillonite, beidellite, nontronite, hectorite, samonite, smectite, kaolinite, serpentine, illite, chlorite, montmorillonite, saponite, sepiolite, fuller's earth, attapulgite, or combinations thereof. The clay may be present in the WSF in an amount from about 1 wt. % to about 20 wt. % based on the total weight of the WSF, alternatively from about 2 wt. % to about 15 wt. % or alternatively from about 3 wt. % to about 10 wt. %.

Additionally or alternatively, in some embodiments, the WSF may further include a pH adjusting agent. In various embodiments, the pH adjusting agent may be a base, an acid, or a buffer. Nonlimiting examples of bases suitable include ammonium, alkali metal, and alkaline earth metal carbonates and bicarbonates, such as $Na_2CO_3$, $K_2CO_3$, $CaCO_3$, $MgCO_3$, $NaHCO_3$, and $KHCO_3$; alkali and alkaline earth metal oxides, such as BaO, SrO, $Li_2O$, CaO, $Na_2O$, $K_2O$, and MgO; ammonium, alkali metal, and alkaline earth metal hydroxides, such as NaOH, $NH_4OH$, KOH, LiOH, and $Mg(OH)_2$; and alkali and alkaline earth metal phosphates, such as $Na_3PO_4$ and $Ca_3(PO_4)_2$. Nonlimiting examples of acids include mineral acids such as hydrochloric acid, sulphuric acid, sulphonic acid, and sulphamic acid; organic acids such as tartaric acid, citric acid, formic acid, acetic acid, monochloroacetic acid, dichloroacetic acid, trichloroacetic acid, sulphinic acid, methanesulfonic acid, lactic acid, glycolic acid, oxalic acid, propionic acid, and butyric acid; ammonium salts and salts of weak bases, such as organic amines; or combinations thereof. The buffer can include a combination of weak acids or weak bases, in combination with the corresponding salts to maintain the pH of a fluid in a desired range. Nonlimiting examples of chemical combinations which may be used as buffers include acetic acid/sodium acetate, sodium carbonate/sodium bicarbonate, and sodium dihydrogen phosphate/sodium monohydrogen phosphate. In some embodiments, the pH adjusting agent may be present in the WSF in a suitable amount that will provide a desired pH. The pH adjusting agent may be present in the WSF in an amount from about 0.1 wt. % to about 15 wt. % based on the total weight of the WSF, alternatively from about 1 wt. % to about 10 wt. % or alternatively from about 1 wt. % to about 5 wt. %.

Additionally or alternatively, in some embodiments, the WSF can further include one or more additives. In various embodiments, the one or more additives may be selected for inclusion in the WSF for improving or changing the properties thereof. The one or more additives can include a viscosifier, an emulsifier, a defoamer, an expansion agent, a salt, a corrosion inhibitor, a mutual solvent, a breaking agent, a relative permeability modifier, a crosslinker, a flocculant, a water softener, an oxidation inhibitor, a defoamer, a thinner, a scavenger, a gas scavenger, a lubricant, a friction reducer, a bridging agent, a vitrified shale, a thixotropic agent, a dispersing agent, a weight reducing additive, a heavyweight additive, a surfactant, a scale inhibitor, a clay control agent, a clay stabilizer, a silicate-control agent, a biocide, a biostatic agent, a storage stabilizer, a filtration control additive, a suspending agent, a foaming agent, latex emulsions, a formation conditioning agent, an elastomer, a gas/fluid absorbing material, a resin, a superabsorber, a mechanical property modifying additive, an inert particulate, the like, or combinations thereof. The one or more additives may be present in the WSF in an amount effective to modify one or more intended properties of the WSF, for example, from about 0 wt. % to about 15 wt. % based on the total weight of the WSF, additionally or alternatively, from about 1 wt. % to about 12 wt. %, additionally or alternatively, from 2 wt. % to about 10 wt. %.

In some embodiments, the WSF can have a density of from about 7 pounds per gallon (lb/gal) to about 20 lb/gal, alternatively from about 7 lb/gal to about 15 lb/gal or alternatively from about 7 lb/gal to about 13 lb/gal.

In some embodiments, the WSF may be used to minimize fluid loss in operation, for example, in the performance of a wellbore servicing operation. In some embodiments, the WSF may be characterized with respect to an "actual fluid loss," which refers to loss of a liquid component of a wellbore servicing fluid, such as via liquid phase filtration into a permeable part of a subterranean formation. According to API-RP-10B-2, fluid loss is expressed in terms of milliliters (ml) that is actually collected in the measurement. For example, in one or more particular embodiments, the WSF may be characterized as exhibiting an actual fluid loss of from about 10 ml per 30 minutes to about 80 ml per 30 minutes on a 60 mesh screen, additionally or alternatively, from about 10 ml per 30 minutes to about 75 ml per 30 minutes, additionally or alternatively, from about 15 ml per 30 minutes to about 75 ml per 30 minutes, at about 180° F. when measured in accordance with test standard API-RP-10B-2. In one or more particular embodiments, the WSF can have an actual fluid loss of from about 10 ml per 30 minutes to about 80 ml per 30 minutes on a slot with a width of about W microns, additionally or alternatively, from about 10 ml per 30 minutes to about 75 ml per 30 minutes, additionally or alternatively, from about 15 ml per 30 minutes to about 75 ml per 30 minutes, at about 180° F. when measured in accordance with test standard API-RP-10B-2.

Additionally or alternatively, in one or more particular embodiments, the WSF may be characterized as exhibiting an actual fluid loss of from about 20 ml per 30 minutes to about 120 ml per 30 minutes on a 60 mesh screen, additionally or alternatively, from about 30 ml per 30 minutes to about 100 ml per 30 minutes, additionally or alternatively from about 30 ml per 30 minutes to about 90 ml per 30 minutes, at about 300° F. when measured in accordance with test standard API-RP-10B-2. In one or more particular embodiments, the WSF has an actual fluid loss of from about 20 ml per 30 minutes to about 120 ml per 30 minutes on a slot with a width of about W microns, alternatively from about 30 ml per 30 minutes to about 100 ml per 30 minutes or alternatively from about 30 ml per 30 minutes to about 90 ml per 30 minutes, at about 350° F. when measured in accordance with test standard API-RP-10B-2.

Also disclosed herein is a method of servicing a wellbore penetrating a subterranean formation. Generally, in the methods of servicing a wellbore disclosed herein, the WSF may be placed into the wellbore within or proximate a permeable zone. As used herein, the term "permeable zone" refers to an area in the wellbore or the subterranean formation adjacent to the wellbore through which fluid can undesirably migrate. Such permeable zones may be present in, for example, the subterranean formation surrounding a wellbore, the wall of a conduit disposed in the wellbore such as a casing, a sealant/cement column disposed in an annulus of the wellbore between the casing and a subterranean formation penetrated by the wellbore, a microannulus interposed between the casing and the sealant/cement column, a microannulus interposed between the sealant/cement column and the formation, or combinations thereof. Permeable zones can include fluid flow paths extending between the wellbore and the surrounding formation, for example, a fissure, a crack, a fracture, a vugular zone or "vug," a streak, a flow channel, a void, a perforation formed by a perforating gun, or combinations thereof. In some embodiments, the permeable zone is a loss circulation zone such as a fracture through which fluids being circulated in the wellbore can undesirably pass from the wellbore into the subterranean formation. Additionally or alternatively, in some embodiments, the permeable zone allows a formation fluid such as water to pass from the surrounding formation into the wellbore, for example, to form crossflows in fluids residing in the wellbore such as a cement slurry before it sets. In a permeable zone, the average size of the openings of the fluid flow paths is herein referred to as an average fracture width of the permeable zone. In some embodiments, the average fracture width of a permeable zone is W. In some embodiments, W is from about 10 microns to about 5000 microns, alternatively from about 10 microns to about 4000 microns, alternatively from about 20 microns to about 3500 microns or alternatively from about 30 microns to about 3000 microns.

In some embodiments, the method of servicing a subterranean formation may generally include preparing the WSF and placing the WSF within a wellbore within or proximate a permeable zone. In various embodiments discussed herein, the WSF, as previously disclosed, may be formulated and/or configured according to the needs of a particular wellbore servicing operation.

In some embodiments, the WSF may be prepared using any suitable method. In some embodiments, the method includes placing a mixture including a particulate material including the palm kernel shells and the base fluid into a blending apparatus (e.g., a mixer, a blender) and blending the mixture until the mixture becomes a pumpable fluid (e.g., a homogeneous fluid). The blending apparatus may be any container that is compatible with the mixture and has sufficient space for the mixture. For example, various configurations of a blender or mixer may be used for blending/mixing the mixture.

In some embodiments, the WSF may be prepared at the wellsite. For example, various components of the WSF may be prepared at a location remote from the wellsite and transported to the wellsite, and, if necessary, stored at the on-site location. When it is desirable to prepare the WSF at the wellsite, one or more solid components of the WSF (for example, the particulate material and/or one or more additives) and the base fluid or components of the base fluid with may be added into the blending apparatus (e.g. a blender tub, for example mounted on a trailer), and the mixture is then blended until the mixture becomes a homogeneous, pumpable fluid. Additionally or alternatively, some components of the WSF, such as additives, may be added to the WSF during preparation thereof (e.g., during blending) and/or on-the-fly (e.g., in real time or on-location) by addition to (e.g., injection into) the WSF when being pumped into the wellbore.

Generally, in some embodiments, a wellbore may penetrate a subterranean formation having one or more permeable zones. In various embodiments, the permeable zone includes a flow path from the subterranean formation into the wellbore for the influx of water, gas, or both from the subterranean formation into the wellbore, for example, a lost circulation zone such as a depleted zone, a zone of relatively low pressure, a zone having naturally occurring fractures, a weak zone having fracture gradients exceeded by the hydrostatic pressure of the drilling fluid, and so forth.

In various embodiments discussed herein, the WSF may be placed within the wellbore proximate a permeable zone in the context of various wellbore servicing operations. The placement of the WSF proximate the permeable zone may depend upon the particular formulation of the WSF and the particular servicing operation in which it is used. The method of servicing the subterranean formation may include performing a particular servicing operation, for example, a drilling operation, a stimulation operation, or a completion operation. In the performance of the servicing operation, the WSF may be placed within the wellbore proximate the permeable zone where a servicing fluid is lost to the permeable zone.

In some embodiments, the WSF disclosed herein may be placed within in the course of a particular servicing operation. Alternatively, in some embodiments, the servicing operation may be discontinued or suspended, the location of one or more permeable zones determined, and the WSF delivered proximate the one or more permeable zones before resuming the servicing operation.

For example, in one or more particular embodiments, the WSF may include or be used as a drilling fluid or "drill-in" fluid, which may be circulated through a wellbore during the course of a drilling operation. In one or more particular embodiments, in the course of a drilling operation, the wellbore may traverse one or more permeable zones. As a result, at least some of a liquid portion of a drilling fluid may be lost to the formation, resulting in the circulation of the fluid in the wellbore being too low to allow for further drilling of the wellbore, referred to as lost circulation.

In one or more particular embodiments where the WSF includes or is used as a drilling fluid or lost circulation fluid (added to or used in conjunction with a drilling fluid), the WSF may be circulated through the wellbore as the wellbore is drilled such that the WSF is contacts and is placed proximate the permeable zone. In one or more particular embodiments where the WSF is used as the drilling fluid and/or a lost circulation fluid added to or used in conjunction with a drilling fluid, the WSF will encounter one or more permeable zones. For example, as the WSF may be circulated through the wellbore during the drilling operation, the WSF may form a filter cake within the subterranean formation, with the particulate material present within the WSF functioning as a bridging agent distributed within the resulting filter cake. In various embodiments, the filter cake may form upon the face of the formation itself, upon a sand screen, upon a gravel pack, or upon another suitable surface within the subterranean formation.

In some embodiments, for example, upon completing the drilling operation, the filter cake may be removed to allow fluids to flow more freely between the formation and the wellbore and/or to allow for additional wellbore servicing operations, such as well completion operations (e.g., primary or secondary cementing operations) or formation stimulation operations. In one or more specific embodiments, when it is desired to remove the all or a portion of the filter cake, at least a portion of the filter cake may be contacted with a clean-up fluid or breaker fluid, such as an acid-containing fluid. In one or more particular embodiments, the WSF may be advantageously employ as a drilling for example, and not intending to be bound by theory, the palm kernel shells present within the WSF may be easily degraded in the presence of an acid. Degradation of the palm kernel shells and any calcium carbonate, if present, and/or removal from the filter cake may allow degradation of the filter cake and/or allow flow-paths (e.g., pinholes) through the filter cake, which may stimulate further degradation of the filter cake.

Additionally or alternatively, in one or more particular embodiments, the WSF may include or be used as a fluid loss control fluid. As similarly noted above, in one or more particular embodiments the wellbore may penetrate a subterranean formation having one or more permeable zones. In one or more particular embodiments, the loss of the servicing fluid (e.g., a drilling fluid or completion fluid) in the course of a servicing operation (e.g., a drilling operation) may be so significant as to require remediation, for example, by placement of a fluid loss control fluid.

In one or more particular embodiments where the WSF includes or is used as fluid loss control fluid, the WSF may form a non-flowing, intact mass capable of withstanding the hydrostatic pressure inside the lost circulation zone. In some embodiments, the WSF can plug the permeable zone and inhibit the loss of subsequently pumped wellbore servicing fluids thus allowing for further wellbore servicing operations. For example, the WSF can contact the permeable zone, and at least a portion of the particulate material (for example, including the palm kernel shells) may be placed within the permeable zone to reduce the loss of fluid from the wellbore into the formation and/or an inflow of fluid from the formation into the wellbore.

Also, a secondary cement/sealant composition may be lost to the formation as it is being placed in the wellbore, thereby rendering the secondary operation ineffective in maintaining isolation of the formation. The fluid loss control fluid and/or lost circulation fluid of the type described herein can flow into at least a portion of the zone and reduce and/or prevent flow of fluid from the wellbore into the formation.

Additionally or alternatively, in one of more embodiments, the WSF of the type disclosed herein may be used as a cementitious fluid. In some embodiments where the WSF includes of is used as a cementitious fluid, the WSF be employed in well completion operations such as primary and secondary cementing operations where the WSF (e.g., the cementitious fluid) is placed proximate a permeable zone. For example, and not intending to be bound by theory, the palm kernel shells present within the WSF may be effective to reduce losses of the WSF (e.g., cementitious fluid) during setting.

In a primary cementing operation, the cementitious fluid may be placed into an annulus of the wellbore and allowed to set such that it isolates the subterranean formation from a different portion of the wellbore. The cementitious fluid thus forms a barrier that prevents fluids in that subterranean formation from migrating into other subterranean formations. Within the annulus, the cementitious fluid also serves to support a conduit, e.g., casing, in the wellbore. In one or more particular embodiments, the wellbore in which the cementitious fluid is positioned belongs to a multilateral wellbore configuration including at least two principal wellbores connected by one or more ancillary wellbores. In secondary cementing, often referred to as squeeze cementing, the cementitious fluid may be strategically positioned in the wellbore to plug a permeable zone such as a void or crack in the conduit, a void or crack in the hardened sealant (e.g., cement sheath) residing in the annulus, a relatively small opening known as a microannulus between the hardened sealant and the conduit, and so forth.

The method of servicing the subterranean formation can include placing the cementitious fluid into the wellbore proximate a permeable zone and allowing at least a portion of the cementitious fluid to set, for example to reduce losses of the cementitious fluid to the permeable zone during setting. The cementitious fluid may be used to permanently seal the annular space between the conduit (e.g., casing) and the wellbore wall. The cementitious fluid can also be used to seal formations to prevent loss of drilling fluid (e.g., in squeeze cementing operations) and for operations ranging from setting kick-off plugs to plug and abandonment of a wellbore.

Various benefits may be realized by utilization of the presently disclosed methods and compositions. By incorporating the particulate material as disclosed herein, the WSF may be used to reduce and/or prevent fluid communication between a wellbore and formation around the wellbore. The disclosed methods and compositions may be used during many different operations, such as drilling, cementing, and completion.

Additional Disclosure

The following are non-limiting, specific embodiments in accordance with the present disclosure.

A first embodiments is a method of servicing a wellbore penetrating a subterranean formation, comprising placing a wellbore servicing fluid (WSF) into the wellbore proximate a permeable zone, wherein the WSF comprises a base fluid and from about 3 wt. % to about 25 wt. % by total weight of the WSF of a particulate material, wherein the particulate material comprises palm kernel shells.

A second embodiment is the method of the first embodiment, wherein the palm kernel shells have a particle size distribution such that at least about 90% of the palm kernel shells, by weight of the palm kernel shells, have a particle size from about 125 microns to about 2,000 microns.

A third embodiment is the method of one of the first through the second embodiments, wherein the palm kernel shells have a multimodal particle size distribution.

A fourth embodiment is the method of one of the first through the third embodiments, wherein the palm kernel shells have a particle size distribution such that at least about 10% of the palm kernel shells, by weight of the palm kernel shells, has a particle size from about 125 microns to about 750 microns.

A fifth embodiment is the method of one of the first through the fourth embodiments, wherein the palm kernel shells have a particle size distribution such that at least about 10% of the palm kernel shells, by weight of the palm kernel shells, has a particle size from about 800 microns to about 1,100 microns.

A sixth embodiment is the method of one of the first through the fifth embodiments, wherein the palm kernel shells have a particle size distribution such that at least about 10% of the palm kernel shells, by weight of the palm kernel shells, has a particle size from about 1,150 microns to about 1,350 microns.

A seventh embodiment is the method of one of the first through the sixth embodiments, wherein the palm kernel shells have a particle size distribution such that at least about 10% of the palm kernel shells, by weight of the palm kernel shells, has a particle size from about 1,400 microns to about 1,800 microns.

An eighth embodiment is the method of one of the first through the seventh embodiments, wherein the particulate material further comprises graphite, calcined petroleum coke, ground laminate, ground tires, ground nut shells, mica particles, polypropylene fibers, polymeric beads, calcium carbonate, glass particles, sand, ceramic particles, ground battery casings, steel particles, or combinations thereof.

A ninth embodiment is the method of one of the first through the eight embodiments, wherein WSF comprises a drilling fluid, and further comprising circulating the WSF through the wellbore to form a filter cake comprising the particulate material.

A tenth embodiment is the method of one of the first through the ninth embodiments, wherein the WSF comprises a fluid loss control fluid, and further comprising, before placing the WSF into the wellbore proximate the permeable zone: performing a servicing operation, suspending the servicing operation, and determining a location of the permeable zone.

An eleventh embodiment is the method of one of the first through the tenth embodiments, wherein the WSF comprises a cementitious fluid, and further comprising, after placing the WSF proximate the permeable zone, allowing the cementitious fluid to set.

A twelfth embodiment is a wellbore servicing fluid comprising from about 3 wt. % to about 25 wt. % by total weight of the wellbore servicing fluid of a particulate material comprising palm kernel shells and a base fluid.

A thirteenth embodiment is the method of the twelfth embodiment, wherein the palm kernel shells have a particle size distribution such that at least about 90% of the palm kernel shells, by weight of the palm kernel shells, have a particle size from about 125 microns to about 2,000 microns.

A fourteenth embodiment is the wellbore servicing fluid of one of the twelfth through the thirteenth embodiments, wherein the palm kernel shells have a multimodal particle size distribution.

A fifteenth embodiment is the wellbore servicing fluid of one of the twelfth through the fourteenth embodiments, wherein the palm kernel shells have a particle size distribution such that at least about 10% of the palm kernel shells, by weight of the palm kernel shells, has a particle size from about 125 microns to about 750 microns.

A sixteenth embodiment is the wellbore servicing fluid of one of the twelfth through the fifteenth embodiments, wherein the palm kernel shells have a particle size distribution such that at least about 10% of the palm kernel shells, by weight of the palm kernel shells, has a particle size from about 800 microns to about 1,100 microns.

A seventeenth embodiment is the wellbore servicing fluid of one of the twelfth through the sixteenth embodiments, wherein the palm kernel shells have a particle size distribution such that at least about 10% of the palm kernel shells, by weight of the palm kernel shells, has a particle size from about 1,150 microns to about 1,350 microns.

An eighteenth embodiment is the wellbore servicing fluid of one of the twelfth through the seventeenth embodiments, wherein the palm kernel shells have a particle size distribution such that at least about 10% of the palm kernel shells, by weight of the palm kernel shells, has a particle size from about 1,400 microns to about 1,800 microns.

A nineteenth embodiment is the wellbore servicing fluid of one of the twelfth through the eighteenth embodiments, wherein the particulate material further comprises graphite, calcined petroleum coke, ground laminate, ground tires, ground nut shells, mica particles, polypropylene fibers, polymeric beads, calcium carbonate, glass particles, sand, ceramic particles, ground battery casings, steel particles, or combinations thereof.

A twentieth embodiment is the wellbore servicing fluid of one of the twelfth through the nineteenth embodiments, further comprising a cement.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as includes, comprises, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A method of servicing a wellbore penetrating a subterranean formation, comprising:
   placing a wellbore servicing fluid (WSF) into the wellbore proximate a permeable zone, wherein the WSF comprises a base fluid and from about 3 wt. % to about 25 wt. % by total weight of the WSF of a particulate material, wherein the particulate material comprises palm kernel shells, and wherein the palm kernel shells have a particle size distribution such that at least about 90% of the palm kernel shells, by weight of the palm kernel shells, have a particle size from about 125 microns to about 2,000 microns.

2. The method of claim 1, wherein the palm kernel shells have a multimodal particle size distribution.

3. The method of claim 1, wherein the palm kernel shells have a particle size distribution such that at least about 10% of the palm kernel shells, by weight of the palm kernel shells, has a particle size from about 125 microns to about 750 microns.

4. The method of claim 1, wherein the palm kernel shells have a particle size distribution such that at least about 10% of the palm kernel shells, by weight of the palm kernel shells, has a particle size from about 800 microns to about 1,100 microns.

5. The method of claim 1, wherein the palm kernel shells have a particle size distribution such that at least about 10% of the palm kernel shells, by weight of the palm kernel shells, has a particle size from about 1,150 microns to about 1,350 microns.

6. The method of claim 1, wherein the palm kernel shells have a particle size distribution such that at least about 10% of the palm kernel shells, by weight of the palm kernel shells, has a particle size from about 1,400 microns to about 1,800 microns.

7. The method of claim 1, wherein the particulate material further comprises graphite, calcined petroleum coke, ground laminate, ground tires, ground nut shells, mica particles, polypropylene fibers, polymeric beads, calcium carbonate, glass particles, sand, ceramic particles, ground battery casings, steel particles, or combinations thereof.

8. The method of claim 1, wherein WSF comprises a drilling fluid, and further comprising circulating the WSF through the wellbore to form a filter cake comprising the particulate material.

9. The method of claim 1, wherein the WSF comprises a fluid loss control fluid, and further comprising, before placing the WSF into the wellbore proximate the permeable zone:
performing a servicing operation;
suspending the servicing operation; and
determining a location of the permeable zone.

10. The method of claim 1, wherein the WSF comprises a cementitious fluid, and further comprising, after placing the WSF proximate the permeable zone, allowing the cementitious fluid to set.

* * * * *